(12) United States Patent
Yoshida

(10) Patent No.: US 7,428,964 B2
(45) Date of Patent: Sep. 30, 2008

(54) CHAIN COVER AND SLAT CONVEYOR USING THE SAME

(75) Inventor: Eiji Yoshida, 68, Kyuhoen 2-chome, Yao-shi, Osaka (JP)

(73) Assignees: Eiji Yoshida, Osaka (JP); Masakazu Yamamoto, Osaka (JP)

( * ) Notice: Subject to any disclaimer, the term of this patent is extended or adjusted under 35 U.S.C. 154(b) by 0 days.

(21) Appl. No.: 11/664,000

(22) PCT Filed: Sep. 29, 2005

(86) PCT No.: PCT/JP2005/017928

§ 371 (c)(1),
(2), (4) Date: Mar. 28, 2007

(87) PCT Pub. No.: WO2006/035857

PCT Pub. Date: Apr. 6, 2006

(65) Prior Publication Data

US 2008/0073184 A1 Mar. 27, 2008

(30) Foreign Application Priority Data

Sep. 30, 2004 (JP) ............................. 2004-286426

(51) Int. Cl.
*B65G 17/06* (2006.01)
(52) U.S. Cl. ...................... 198/850; 198/817
(58) Field of Classification Search .............. 198/848, 198/850–853, 817, 867.14, 867.15
See application file for complete search history.

(56) References Cited

U.S. PATENT DOCUMENTS

| 2,954,113 | A | * | 9/1960 | Hibbard et al. | ......... 198/867.15 |
| 3,333,678 | A | * | 8/1967 | Rodman | ..................... 198/852 |
| 5,779,583 | A | * | 7/1998 | Nakatani et al. | ....... 198/867.14 |
| 6,662,545 | B1 | | 12/2003 | Yoshida | |
| 6,952,916 | B1 | * | 10/2005 | Fountaine | ................... 59/78.1 |
| 7,225,918 | B2 | * | 6/2007 | Freudelsperger | ............ 198/853 |

FOREIGN PATENT DOCUMENTS

| JP | 3-023107 | 1/1991 |
| JP | 5-229619 | 9/1993 |
| JP | 2001-315936 | 11/2001 |

\* cited by examiner

*Primary Examiner*—James R Bidwell
(74) *Attorney, Agent, or Firm*—Wenderoth, Lind & Ponack, L.L.P.

(57) ABSTRACT

A chain cover includes side covers each formed with a shaft hole for receiving a coupling pin of a roller chain, two top covers each having a length substantially equal to a chain pitch of the roller chain, and a coupling plate coupling the top covers adjacent to each other. The side cover at each end of the chain cover has a convexly arcuate front edge concentric with the shaft hole and a concavely arcuate rear edge similar to the front edge, and the coupling plate and two top covers cooperate to form a slat. A plurality of these chain covers can be mounted on a plurality of parallel roller chains to cover the top and sides of each roller chain and form a flat goods conveying surface between the roller chains, thereby forming a slat conveyor which is less expensive than a roller conveyor and provides excellent conveying stability.

9 Claims, 4 Drawing Sheets

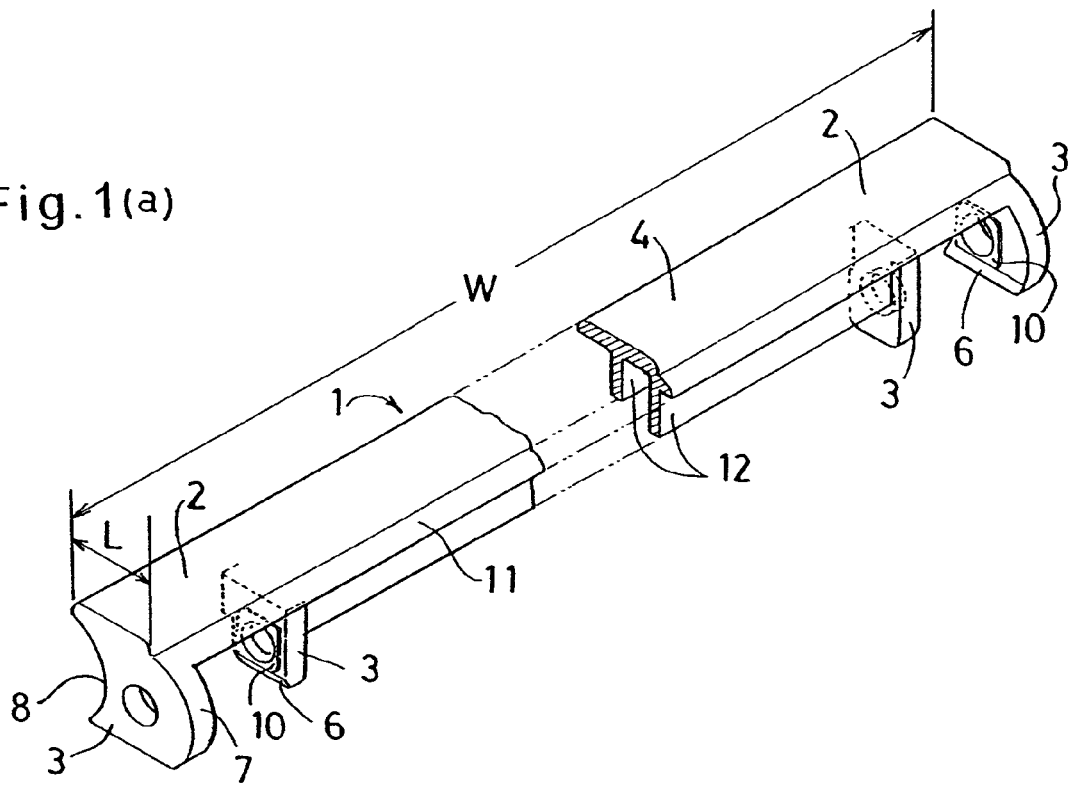
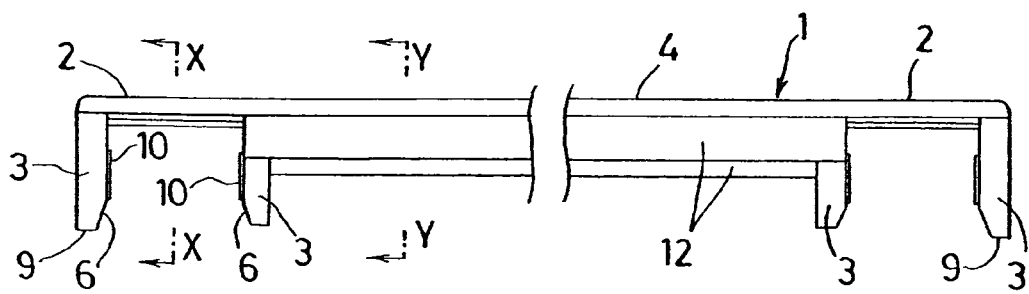
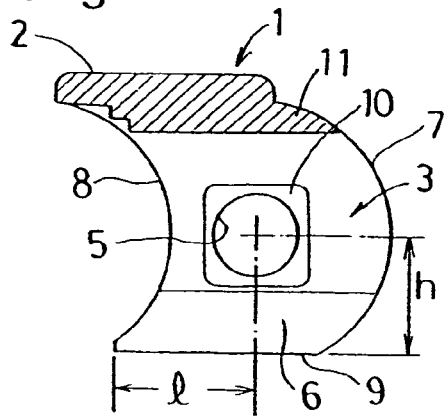

CHAIN COVER AND SLAT CONVEYOR USING THE SAME

BACKGROUND OF THE INVENTION

1. Technical Field

This invention relates to chain covers mounted on a plurality of roller chains arranged in parallel so as to cover the top and sides of the roller chains and form a flat goods conveying surface between the roller chains, and a slat conveyor formed by the chain covers.

2. Background Art

A prior art chain cover of this type is disclosed in JP Patent laid-open publication 2001-315936. The chain cover shown in JP Patent laid-open publication 2001-315936 includes a top cover which is a flat plate having a length about equal to the chain pitch, and side covers hanging from both ends of the top cover. The side covers serve to cover both sides of the roller chain and each side cover is formed with a shaft hole in which one end of a coupling pin of the roller chain is received, a convexly arcuate front edge which is concentric with the shaft hole, a concavely arcuate rear edge which corresponds to the front edge, and a tapered guide surface which extends outwardly obliquely on the inner surface of the side cover below the shaft hole.

With this chain cover, the top cover for covering the top of a roller chain is supported by links of the roller chain, so that no load will be applied to each coupling pin, and such chain covers can be mounted on general-purpose roller chains on which the amount of protrusion of coupling pins from pin links is small, so that a flat conveying surface can be formed on the chains.

However, with such chain covers, a chain conveyor having a wide goods conveying surface cannot be formed, so that the application of the chain conveyor obtained is limited. Also, although the width of the goods conveying surface can be increased by extending both ends of the top covers sidewise, it is difficult to increase the width of the goods conveying surface drastically with this method because the length of the extended portion is limited to assure strength.

SUMMARY OF THE INVENTION

If a wide goods conveying surface can be formed by use of chain covers, a more inexpensive chain conveyor than a roller conveyor can be provided, so that it becomes possible to convey by an inexpensive chain conveyor goods which have heretofore been conveyed by a roller conveyor. Also, a chain conveyor formed by using chain covers can provide functionality which is not so different from the functionality of a known slat conveyor, and can provide improved conveying stability in comparison with the conveying by a roller conveyor.

An object of this invention is to provide a chain cover which meets such requirements and a slat conveyor formed by using such chain covers.

To solve the problem, according to the present invention, a chain cover is provided which comprises side covers each formed with a shaft hole to receive one end of each coupling pin of a roller chain, a number n (n≧2) of flat top covers arranged in parallel and each having a length substantially equal to the chain pitch of the roller chain, and a coupling plate for coupling the top covers together, wherein each side cover for covering the sides of the roller chain hangs from each end of the top cover for covering the top of the roller chain, the side cover at each end of the chain cover has a convexly arcuate front edge which is concentric to the shaft hole and a concavely arcuate rear edge which is similar to the front edge, and the coupling plate and a number n of the top covers cooperate to form a slat.

With this chain cover, preferably, the side cover at each end has a bottom surface which is straight and parallel to the top plate, and the distance from the center of the shaft hole to the straight bottom surface and the distance from the center of the shaft hole to the rear edge are both set to be about half the chain pitch; a reinforcing rib may be provided on the bottom of the coupling plate; the number n of the top covers, the side covers hanging from both ends of each top cover, the coupling plate between the top covers, and the reinforcing rib at bottom of the coupling plate may be made integrally of a resin.

Also, the top covers arranged at both ends may be provided with an extension protruding outwardly to increase the width of a goods conveying surface.

According to this invention, a conveyor is also provided in which the chain covers described above are combined with roller chains. The conveyor comprises a number n (n≧2) of endless roller chains arranged in parallel and each stretched around a driving sprocket and a driven sprocket, and the chain covers, the number of which corresponds to the number of pitches of each roller chain. The chain covers are those according to this invention and they are arranged in the same direction and mounted on the roller chains. When all the chain covers are mounted, the slat conveyor according to this invention is formed which has a flat goods conveying surface with slats of the chain covers continuous with one another in an endless fashion.

The chain cover according to the present invention is considered to be one which comprises a number n of chain covers (one disclosed in Patent Publication 1) each of which is opposed to one roller chain, arranged in parallel and coupled together by a coupling plate which is continuous with top covers. The number n of the top plates arranged in parallel and the coupling plates between the top covers form a wider slat (in comparison with the chain cover of Patent document 1) and produce a goods conveying surface of a width not inferior in comparison with a roller conveyor.

The chain cover can be provided at low cost if it is made of a resin by integral molding. By combining with a number n of roller chains, a more inexpensive slat conveyor than a roller conveyor can be formed. A slat conveyor can provide higher conveying stability than a roller conveyor because it has a flat conveying surface, so that goods protection can be assured.

Also, it is possible to change the width of goods conveying surface freely by changing the number n of chains and top plates used, thereby solving the problem of limited application of conveyors.

BRIEF DESCRIPTION OF THE DRAWINGS

FIG. 1(a) is a perspective view of one embodiment of the chain cover according to this invention;

FIG. 1(b) is a front view of the chain cover;

FIG. 1(c) is a sectional view taken along line X-X of FIG. 1(b);

FIG. 1(d) is a sectional view taken along line Y-Y of FIG. 1(b);

DETAILED DESCRIPTION OF THE INVENTION

Figure 2:
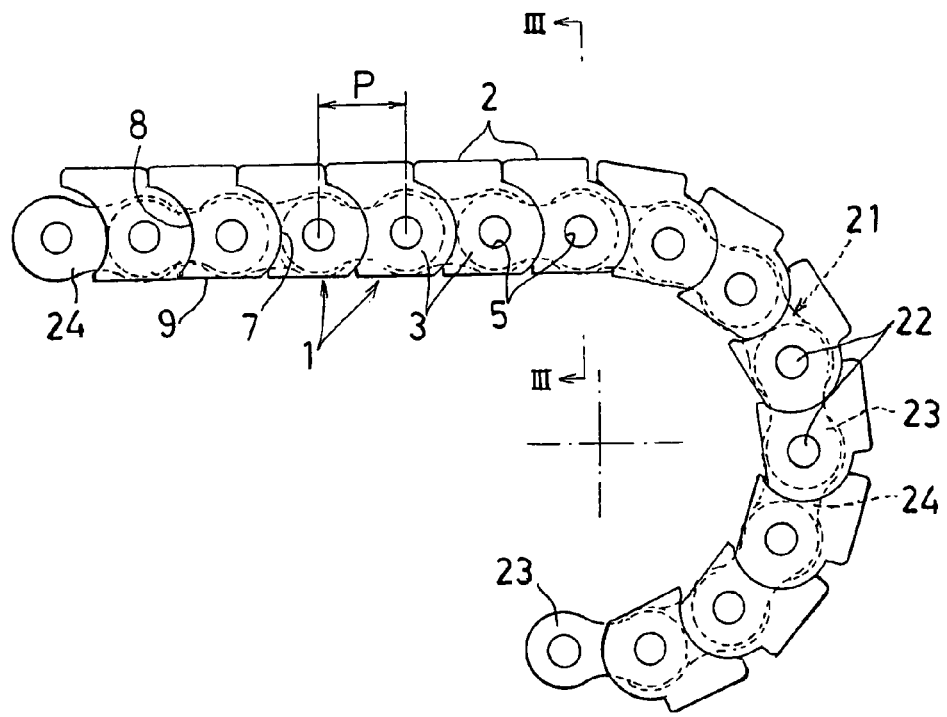
FIG. 2 is a side view of a plurality of the chain covers of this invention mounted on roller chains.

Hereinbelow, embodiments of this invention are described with reference to the accompanying drawings FIGS. 1 to 6. Chain covers 1 shown in FIG. 1 are combined with two endless roller chains arranged in parallel to form a slat conveyor. Each chain cover 1 includes as many top covers 2 as there are chains, side covers 3 hanging down from both ends of each top cover 2, and a coupling plate 4 coupling the top covers 2 together. The chain cover 1 shown here is made integrally of a resin by injection molding and can be made at low cost. But it may be a metal casting.

The length L of each top cover 2 is substantially equal to a chain pitch P (see FIG. 2). The width $W_1$ of each top cover 2 is of a size proportional to one roller chain. Particularly, as shown in FIG. 3, the width $W_1$ is set to be substantially equal to the width w of each roller chain 21 covered by the top cover 2 plus the thicknesses of the side covers 3 at both ends of the top cover.

Each side cover 3 has a shaft hole 5 for receiving one end of a coupling pin 22 of the roller chain 21, and a tapered guide surface 6 for easy mounting of the coupling pin 22 into the shaft holes 5. Also, the side covers 3 at both ends of the chain cover 1 are each formed with a convexly arcuate front edge 7 which is concentric with the shaft hole 5, and a concavely arcuate rear edge 8 which corresponds in shape to the front edge 7. Here, for convenience of explanation, the convex edge 7 is referred to as a front edge and the concave edge 8 is referred to as a rear edge, but actually they have no relation of front and rear to each other.

The side covers 3 arranged inside have a simplified shape with only a portion formed with the shaft hole 5 left for saving of material and easy molding, but they may be made to the same shape as the side covers 3 at both ends of the chain cover. Also, the shaft holes 5 may be through holes or not-through holes.

Figure 3:
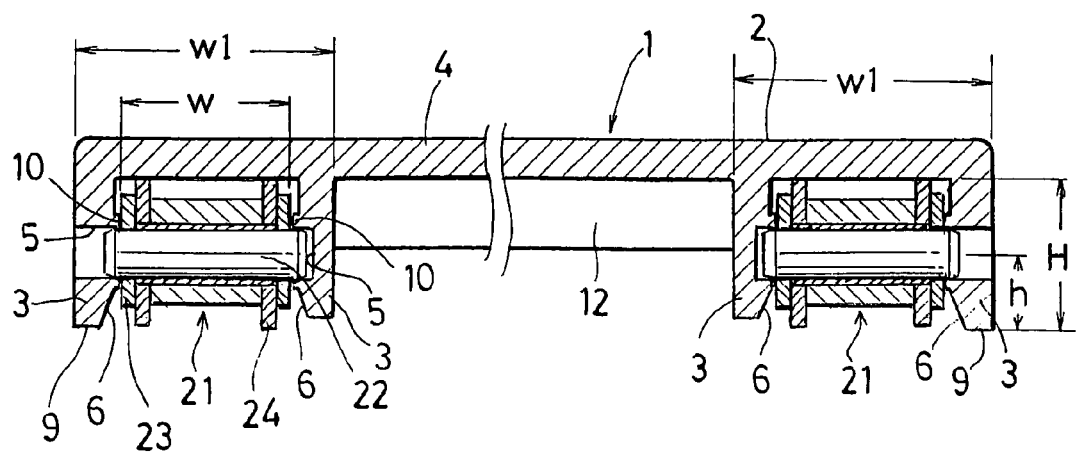
FIG. 3 is a sectional view taken along line III-III of FIG. 2.

As shown in FIG. 3, the height H of the side covers 3 at both ends is substantially equal to the height of the roller chains 21. Also, the bottom surfaces 9 of the side covers 3 at both ends are straight surfaces that are parallel to the top covers 2 and the height h from the center of each shaft hole 5 to the bottom surface 9 is substantially equal to half of the chain pitch P. Further, an acute corner portion formed at the intersection of the rear edge 8 and the bottom surface 9 is removed and a distance from the center of the bottom surface 9 to the rear edge 8 is set to be substantially equal to half the chain pitch P. By meeting these requirements, the effect of preventing the chain cover 1 from coming off increases.

Further, each side cover 3 is formed with a raised portion 10 of a small area on its inner surface around the shaft hole 5 and the distance between the raised portions 10 of the opposed side covers 3 is set to be substantially equal to the distance between the opposed pin links 23 of the chain, so that the raised portions 10 narrow the area on which the opposed side covers 3 are in contact with the roller chain 21. Also, between the side covers 3 at both ends, an auxiliary cover 11 is provided which extends forwardly of the top covers 2. The auxiliary cover 11 is a preferable element which serves to fill a gap formed between the chain covers at turning points where the chain 21 turns.

The coupling plate 4 is continuous with the top plates 2 on both sides. The coupling plate 4 and the top plates 2 cooperate to form a slat having a flat upper surface having a length L and a width W. If the chain covers shown here are adopted, the width of their slats is the required width of the conveyor. The width of the slats is adjusted by changing the distance between the top plates 2. The larger the width of the coupling plate 4 (that is, the distance between the top plates), the more remarkably the coupling plate tends to flex. Therefore, if flexing due to large width is feared, the coupling plate 4 should be provided with a reinforcing rib 12 at its bottom. With the chain cover of this embodiment, two reinforcing ribs 12 are provided, but the number of reinforcing ribs is not limited. If a reinforcing rib 12 is provided, the coupling plate 4 may be thin, so that the material cost can be reduced.

With the chain covers 1 of a structure described above, as shown in FIG. 2, a plurality of chain covers 1 of the same specification are arranged in the same direction for two lines of roller chains 21 arranged in parallel (only one line is shown) and are mounted so that one chain cover 1 engages one coupling pin. The mounting work is done by pressing each side of the chain cover 1 on one chain 21 and pushing the cover 1 downward or obliquely downward. When the chain cover 1 is pushed down, a component force acting on the contact points between the tapered guide surfaces 6 and the coupling pins 22 elastically deforms the side covers 3 and pushes them wide, so that both ends of each coupling pin 22 will be received in the opposed shaft holes 5 and the side covers 3 will restore elastically and maintain engagement with the coupling pins 22.

FIG. 2 shows the side of the roller chain with the chain covers 1 mounted. In this state, as shown in FIG. 3, the top covers 2 are supported on roller links 24 of the chains, so that the coupling pins 22 will not be under heavy loads.

Figure 4:
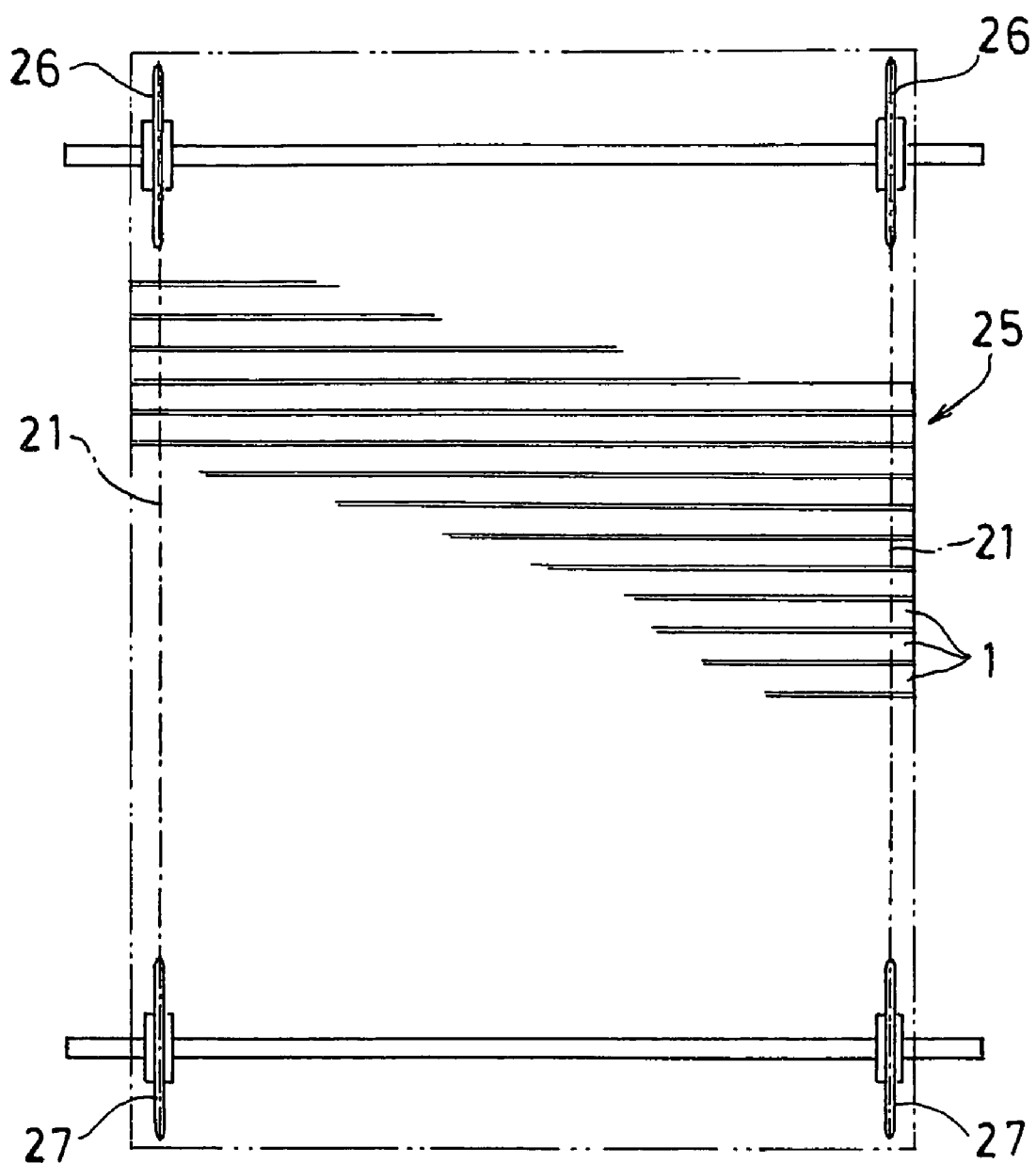
FIG. 4 is a plan view of the slat conveyor of this invention.

FIG. 4 shows a slat conveyor formed by use of the chain covers 1 shown in FIGS. 1 to 3. The slat conveyor 25 comprises two endless roller chains 21 arranged in parallel, two driving sprockets 26 and two driven sprockets 27, each roller chain 21 being trained around one driving sprocket 26 and one driven sprocket 27, and as many chain covers 1 as the pitches being mounted over the entire range of each roller chain 21. When all the chain covers 1 have been mounted, slats each formed by the top plates 2 and the coupling plate 4 of each cover 1 continue in an endless fashion, thus forming a slat conveyor having a flat goods conveying surface. Each driving sprocket 26 is provided with a driving source (not shown) such as a geared motor and is driven thereby.

Figure 5:
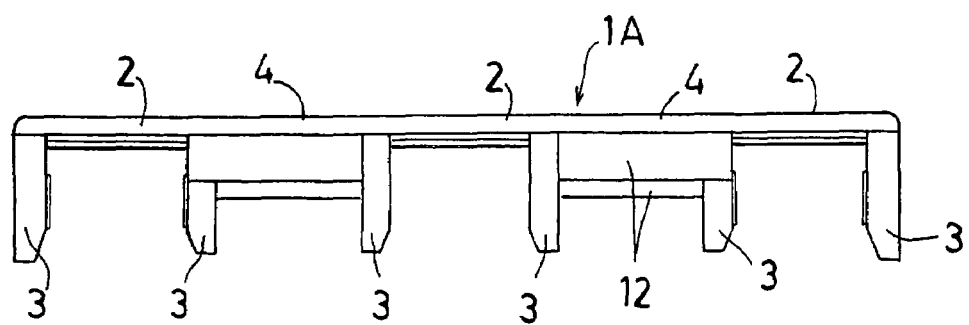
FIG. 5 is a front view of another embodiment of the chain cover.

Depending on the width requirement for the conveyor, more than two roller chains 21 can be provided. FIG. 5 shows a chain cover of an embodiment used when three roller chains are installed. This chain cover 1A includes three chain covers arranged in parallel, each of the chain covers having a top plate 2 and two side covers 3 hanging from both ends of the top plate 2, and coupling plates 4 each coupling the adjacent chain covers together. Among the side covers 3, ones arranged at both ends are provided with a convex front edge and a concave rear edge, but other side covers may not be provided with arcuate front or rear edges because they are invisible from outside.

Figure 6:
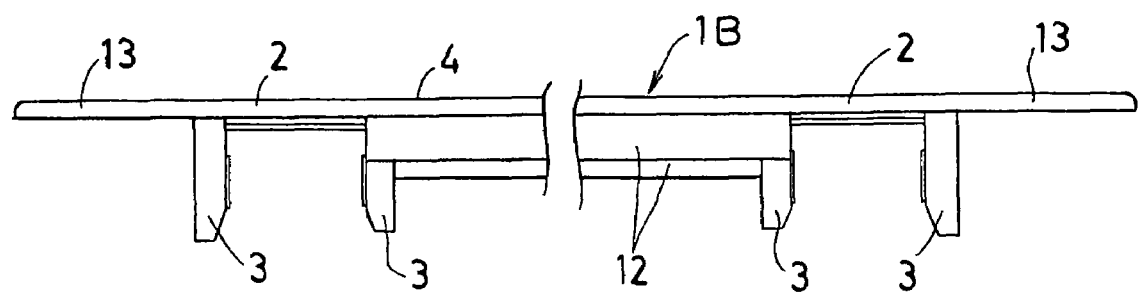
FIG. 6 is a front view of still another embodiment of the chain cover.

The chain cover according to this invention may be combined with four or more roller chains. Also, as shown in FIG. 6 as a chain cover 1B, the chain cover may have extensions 13 extending outwardly from the top plates 2 at both ends to increase the width of the goods conveying surface of the conveyor.

The invention claimed is:

1. A slat conveyor comprising:
    at least two endless roller chains arranged in parallel and each trained around a driving sprocket and a driven sprocket; and
    a plurality of chain covers corresponding in number to a number of pitches of each of the roller chains;
    wherein each of said chain covers comprises side covers each formed with a shaft hole to receive one end of each coupling pin of a respective one of said roller chains, at least two flat top covers arranged in parallel and each having a length substantially equal to the chain pitch of the respective one of said roller chains, and a coupling plate coupling each adjacent pair of said top covers together, each of said top covers covering a top of the respective one of the roller chains, and each of said side covers hanging from one end of each of said top covers for covering sides of the respective one of the roller chains, the side covers at both ends of each of the chain covers each having a convexly arcuate front edge which is concentric to said shaft holes and a concavely arcuate rear edge which corresponds to said front edge;

wherein said coupling plate and said at least two top covers of each of said chain covers cooperate to form a slat; and wherein said chain covers are arranged in the same direction and mounted on said roller chains, thereby forming an endless flat goods conveying surface by said slats.

2. The slat conveyor of claim 1, wherein for each of said chain covers, said side covers at both ends each have a bottom surface which is straight and parallel to said top plates, and a distance from a center of said shaft hole to said straight bottom surface and a distance from the center of said shaft hole to said rear edge are both set to be about half said chain pitch.

3. The slat conveyor of claim 1, wherein for each of said chain conveyors, a reinforcing rib is provided on a bottom of said coupling plate.

4. The slat conveyor of claim 3, wherein for each of said chain conveyors, said top covers, said side covers, said coupling plate, and said reinforcing rib are made integrally of a resin.

5. The slat conveyor of claim 1, wherein for each of said chain covers, said top covers at both ends are each provided with an extension protruding outwardly.

6. The slat conveyor of claim 2, wherein for each of said chain covers, said top covers at both ends are each provided with an extension protruding outwardly.

7. The slat conveyor of claim 3, wherein for each of said chain covers, said top covers at both ends are each provided with an extension protruding outwardly.

8. The slat conveyor of claim 4, wherein for each of said chain covers, said top covers at both ends are each provided with an extension protruding outwardly.

9. The slat conveyor of claim 1, wherein for each of said chain covers, said top covers, said side covers, and said coupling plate are made integrally of a resin.

* * * * *